Oct. 8, 1935. A. PATZIG 2,016,753
TORSIONAL SPRING SYSTEM FOR VEHICLES
Filed March 25, 1935
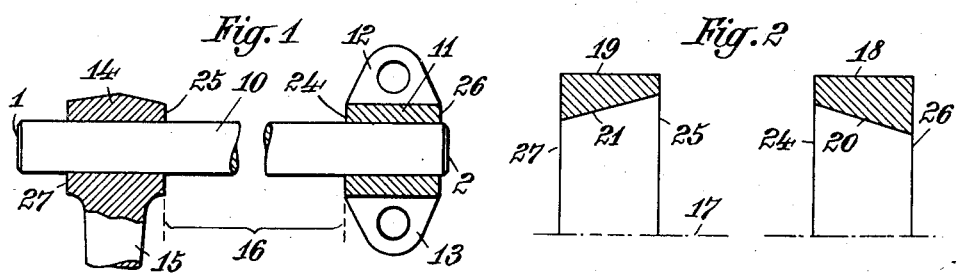
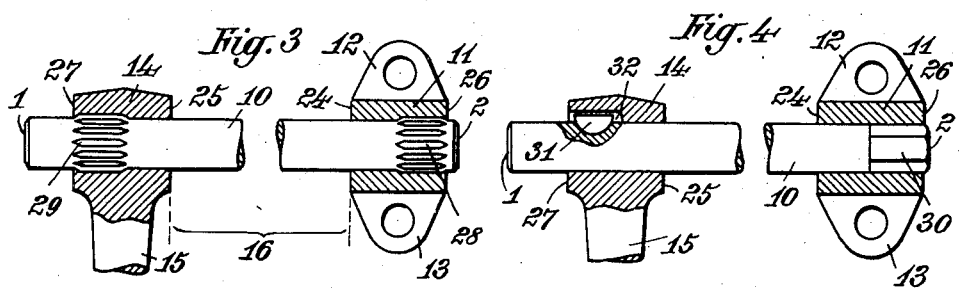
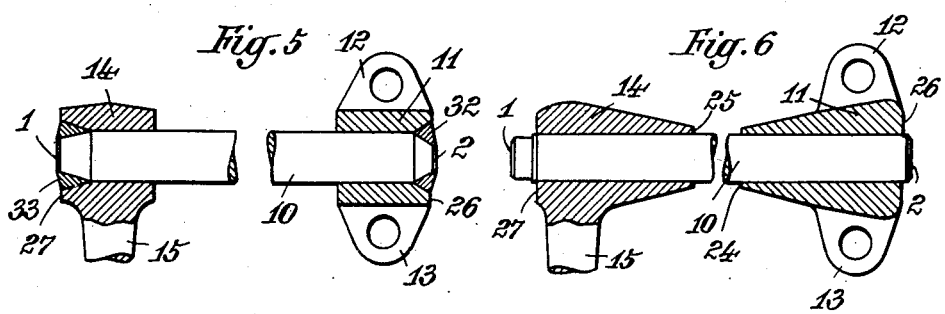
Inventor:
Alfred Patzig
By Blackmore, Spencer & Flint
attorneys Patented Oct. 8, 1935

2,016,753

UNITED STATES PATENT OFFICE 2,016,753

TORSIONAL SPRING SYSTEM FOR VEHICLES

Alfred Patzig, Russelsheim-on-the-Main, Germany, assignor to General Motors Corporation, Detroit, Mich., a corporation of Delaware Application March 25, 1935, Serial No. 12,847
In Germany February 24, 1933

5 Claims. (Cl. 267—57)

This invention relates to means of rigidly attaching members such as brackets or arms to shafts which are subjected to torsional stresses applied through the said members.

More particularly, this invention is concerned with the fitting of brackets and arms or the like to torsional rod springs and specifically, their embodiment in vehicles as torsional spring systems.

Members such as arms have been connected to torsional rod springs by means of splines, ribs, serrations, keys, etc. Alternatively, they have been shrunk or pressed on to the rods after making the inside diameter of the holes in the members into which the rod is inserted, less than the outside diameter of the rod.

It has been found that torsional springs which are connected to their brackets, etc., by ribs, keys or other positive means, will soon break even if the portions within the brackets, etc., are made considerably thicker than the body of the spring, to make up for the weakening by the ribs or the like. It was believed that such springs broke on account of the notch effect of the brackets, etc., and attempts were made to cure this by merging the thinner portions of the spring into the thicker ones so as to provide a gradual change in section rather than a sudden one. This, however, proved ineffective.

Torsion rod springs were then made having a diameter equal to their thickest portions throughout their length, but this was not a satisfactory solution for the following reason:—A torsional spring is the more resilient, the longer it is, or the smaller its diameter is. Length is obviously limited by the length of the vehicle, say, a motor car, on which the springs are mounted, and so sufficiently resilient springs can only be obtained by making their diameter not larger than required for their function as springs, since springs whose diameter is larger than the said diameter, possess lower energy-absorbing capacity and lack resiliency.

The object of the invention is an improved means of rigidly attaching or fitting members such as arms or brackets to shafts, torsion rod springs or the like, which are subjected to torsional stresses applied through the said members.

According to the invention, members such as arms or brackets are attached to the rod by means of a shrinking or force fit of such a character that the torsional re-action between the rod and the member is distributed elastically, so to speak, within the connection. This is effected by providing a sleeve connection which grips the rod most tightly at fitted points of the connection most removed, axially of the rod, from any other applied torsional force and less tightly at fitted places of the connection approaching such applied torsional force, so that in effect, the specific surface pressures on incremental zones of the fitted sleeve, axially of the rod, vary inversely as the torsional stresses therein induced by such other torsional force. The surface pressure which is the shrinking or force fit pressure, is reduced where the torsional stress on the spring would otherwise be a maximum by reducing the diametral difference between the rod and the bore of the member connected thereto at this point. Alternatively, it may be effected by tapering the outer diameter of the sleeve portion of the member to a smaller diameter towards the point where the torsional stress on the spring would otherwise be a maximum.

If desired, additional positive attaching means such as serrations, keys, welds, etc., may be used between the rod and the member attached thereto, adjacent to the point at which the surface pressure between the rod and the member is greatest, i. e., at the place most removed from the working portion of the rod. In any case, the rod is of practically uniform cross section or diameter throughout its length and the structure of its surface is also uniform throughout its length between and including the surfaces comprising the aforesaid shrinking or force fit. It will be appreciated that the maximum and minimum diametral difference between the ends of the bore in the member and the diameter of the rod is a matter of only a few hundredths of a millimeter in a rod having a diameter of about 18 millimeters.

Also, if desired, according to the invention, the pressure resulting from the diametral difference and required for connecting the rod and a member or part such as an arm, is reduced by interposing hardened products of combustion between the rod and the hole in any such part in a manner later to be described.

The improvement achieved in a connection according to this invention, is based on the knowledge that the principal condition for the durability of torsional springs is their oscillatory strength, and that the condition for such strength is uniform surface structure of the springs. Damage to the surface when connecting the spring and the parts by shrinking or force fit, and excessive local stress whose influence is similar to that of damaged portions, should be avoided.

Considering now, a torsion rod spring with members attached to its ends, the torsional stress on the spring is a maximum at the "inner" end of the part, which is that end of the part which is removed from the adjacent end of the spring. The torsional stress decreases from this end in the direction of the opposite, or "outer" end of the part. By reducing at the inner end, the stress resulting from the shrinking or force fit pressure, the spring is relieved at this point and becomes less liable to break.

In the example now under consideration, a more favorable distribution of the torsional stresses is effected either by making the inside diameter of the hole in which the spring is seated, largest at the inner end of the part, from which end the inside diameter decreases toward the outer end, or by making the diameter of the rod greater towards the outer end of the part, so that the stress from the shrinking or force fit pressure is reduced by the lesser diametral difference at that point where the torsional stress is a maximum; or alternatively it can be effected by reducing the outside diameter of the part at its inner end. It will be apparent also that any or all of these means of varying the surface pressure throughout the connection may be employed separately or in combination. In all cases, the stress on the spring is reduced and its diameter, or cross section, becomes smaller in proportion.

The provision of hardened products of combustion between the torsion rod spring and an attached part to increase the hold with a given shrink or force fit pressure is obtained, when desired, as follows:—There is always a skin of oil or other fatty substance on the spring and in the hole of the part and this skin or film is preserved after the spring and the part have been connected by shrinking or force fit pressure. By heating the members at the point, or points, where they are connected, the film is coked or cracked and a solid product of combustion is formed by which the grip of the part, or parts, on the spring is strengthened so much that less pressure is required for effectively connecting the members. The stress on the spring is also reduced and its diameter, or cross section, becomes smaller in proportion. Obviously, the mechanical properties of the spring must be considered when heating it.

In the accompanying drawing, various torsional spring systems embodying my invention are illustrated by way of example.

In the drawing

Fig. 1 is a partly sectional elevation of a spring which is secured in a bracket at one of its ends, and on which an arm is secured near its other end, by shrinking or pressure, Fig. 2 is a diagram showing the variation of the inside diameters of the holes in the bracket and in the arm, for effecting a more uniform distribution of the stress, as described, Fig. 3 is a partly sectional elevation of a system which is similar to that illustrated in Fig. 1, but in which serrations are formed on the spring where it is inserted in the holes of the bracket and the arm, Fig. 4 is a partly sectional elevation of a spring system in which the serrations are replaced by a member of polygonal cross section on the spring where it is inserted in the bracket, and a key where it is inserted in the arm, Fig. 5 is a partly sectional elevation of a system in which the ends of the spring are welded in the bracket and in the arm, respectively, and Fig. 6 is a partly sectional elevation of a spring system in which the outside diameter of the sleeves in the arm and the bracket is reduced in the direction away from the adjacent ends of the spring.

Referring now to the drawings, in all figures, except Fig. 2, the spring, here shown as a rod of circular cross section, is designated by the numeral "10". 11 is a sleeve on a bracket with suitable eyes 12 and 13 for securing it to the motor car or the like, and one end of the spring 10 is placed in the bracket and held by shrinking or force fit pressure. In the vicinity of the free end 1 of the spring 10, an arm 15 is placed on the spring with a sleeve 14, and secured thereon by shrinking or force fit pressure. 16 is the effective length of the spring which is shown broken away between the inner end 24 of the sleeve 11, and the inner end 25 of the sleeve 14. The arm 15 is connected to a wheel, not shown, at its free end.

As will appear from Fig. 1, the spring 10 is of uniform cross section from its free end 1 to its secured end 2, and there is no variation of its diameter in the sleeves 11 and 14. Therefore, the spring 10 is machined uniformly throughout its length 1—2, and there is no different machining for the seats of sleeves 11 and 14. The fibres in the surface structure are arranged uniformly. The grip of the sleeves 11 and 14 which is produced by shrinking or force fit, must obviously be sufficient for transmitting the torque.

As mentioned, it is desirable for a more favorable distribution of the stress, that the pressures at the inner ends 25 and 24, respectively, of the sleeves 14 and 11, should be reduced. As described, this is effected by increasing the inside diameter of the holes in the sleeves 11 and 14 in which the spring is fitted, in the direction of the inner ends 24 and 25, respectively, of the sleeves 11 and 14. Fig. 2 shows the variation of the diameters, drawn to a much magnified scale. In Fig. 2, the axis of spring 10 is indicated at 17, and 18 and 19 show the seats of the spring 10 in the respective sleeves 11 and 14. The seats are cylindrical and the cross section of the spring is uniform throughout its length. The holes in the respective sleeves, however, are tapered, as shown at 20 and 21. It is not necessary that they should be exact truncated cones, as shown, but the surfaces 20 and 21 might also be curved. The sectioned areas between 18 and 20, and 19 and 21, correspond to the total pressures at the respective seats. As mentioned, the configuration of holes 20 and 21 may be as desired, but under all conditions the diametral difference must be a minimum at the inner ends 24 and 25 of the respective sleeves, and increase in the direction of their outer ends 26, 27.

Referring now to Fig. 3, the spring 10 and the sleeves 11 and 14 are designed substantially as described but the spring is equipped with serrations 28 where it is seated in the sleeve 11 of the bracket, and with serrations 29 where it is seated in the sleeve 14 of the arm 15. Otherwise, the diameter of the spring 10 is uniform. When the spring and the sleeves are connected, the serrations 28 and 29 penetrate into the material of the sleeves.

Referring now to Fig. 4, the spring 10 is provided with a hexagonal portion 30 where it is seated in the sleeves 11, while its connection to the sleeve 14 is effected by a key 31 in the spring, and a spline 32 in the sleeve.

Referring now to Fig. 5, the spring is cylindrical with the exception of its ends 1 and 2, where it is tapered. Corresponding tapered recesses are formed in the outer ends 26 and 27 of the respective sleeves, and filled with welding material 32 and 33, respectively.

Referring now to Fig. 6, this shows the other expedient referred to by which the stress at the inner ends of the sleeves is reduced. In this system, the sleeves 11 and 14 are tapered from their thicker outer ends 26 and 27 toward their thinner inner ends 24 and 25, respectively. In this system, the pressure exerted by the force fit is a minimum at 24 and 25 while the torsional stress on the spring is a maximum at the same points. The stress resulting on the pressure increases from the inner to the outer end of each sleeve while the torsional stress decreases in the same direction.

If it is desired to eliminate the additional means illustrated in Figs. 3 to 6 for anchoring the spring in the sleeves—which, it is understood, are by no means indispensible since a plain spring 10 may be used, as shown in Fig. 1—or to reduce the pressure between the spring and the parts in whose holes it engages, the cracking or coking of the film on the members, as described, is resorted to. The connection obtained in this manner will stand a much higher torque or, for a given torque, it permits a considerable reduction of the shrinking or force fit pressure.

By way of example, a steel spring of 1¼ in. diameter was forced into a hole of 2 in. length and it was found that a satisfactory connection is obtained by heating for 5 to 15 minutes at temperatures from 250 to 500 centigrade. This spring, machined to .1 millimetre oversize, was forced into the hole at a pressure of 7 metric tons. After the connection had been heated as described, the force for moving the spring out of the hole was found to be 56 metric tons, or eight times the pressure required for making the connection.

It has been found that the grip is much improved with less diametral difference, shorter heating periods, and lower temperatures. The three factors, diametral difference, temperature and duration of heating, are obviously determined by the size and the material of the parts to be connected, and by the power to be transmitted.

If the parts are welded as shown in Fig. 5, extra heating for coking or cracking the film of oil or the like is not required.

I claim:

1. In a torsional spring system for vehicles, a bracket adapted to be attached to a vehicle, a torsional spring having uniform cross section and uniform surface structure throughout its length inserted in a hole in said bracket whose inside dimension is less than the outside dimension of the spring before the spring is inserted in the bracket, an arm having a hole with which it is placed on the spring and whose inside dimension is less than the outside dimension of the spring before the arm is placed on the spring, and a product of combustion inserted between said spring, said arm and said bracket, for strengthening the grip of said parts on the spring.

2. In a torsional spring system for vehicles, a bracket adapted to be attached to a vehicle, a torsional spring having uniform cross section and uniform surface structure throughout its length inserted in a hole in said bracket whose inside dimension is less than the outside dimension of the spring before the spring is inserted in the bracket, an arm having a hole with which it is placed on the spring and whose inside dimension is less than the outside dimension of the spring before the arm is placed on the spring, and a product of combustion inserted between said spring and one of the parts to which the spring is connected, for strengthening the grip of the part on the spring.

3. In a torsional spring system for vehicles, a bracket adapted to be attached to a vehicle, a torsional spring having uniform cross section and uniform surface structure throughout its length inserted in a hole in said bracket whose inside dimension is less than the outside dimension of the spring before the spring is inserted in the bracket, an arm having a hole with which it is placed on the spring and whose inside dimension is less than the outside dimension of the spring before the arm is placed on the spring, and coke obtained by heating a fatty substance and inserted between said spring and one of the parts to which the spring is connected, for strengthening the grip of the part on the spring.

4. In a torsional spring system for vehicles, a bracket adapted to be attached to a vehicle, a torsinal spring having uniform cross section and uniform surface structure throughout its length inserted in a hole in said bracket whose inside dimension is less than the outside dimension of the spring before the spring is inserted in the bracket, an arm having a hole with which it is placed on the spring and whose inside dimension is less than the outside dimension of the spring before the arm is placed on the spring, and a cracking product of oil inserted between said spring and one of the parts to which the spring is connected, for strengthening the grip of the part on the spring.

5. In combination, a shaft and a member through which torsional forces are applied to the shaft, said member being provided with a sleeve portion embracing the shaft, the relative dimensions of the shaft and the sleeve portion varying axially of the shaft, and the combustion products of an oily substance between the shaft and the sleeve portion, whereby the sleeve portion grips the shaft with a surface pressure which decreases to a minimum in that end of the sleeve towards a working portion of the shaft, from a maximum value in a portion of the sleeve farther removed therefrom.

ALFRED PATZIG.